United States Patent [19]
Ascoli

[11] 4,210,832
[45] Jul. 1, 1980

[54] ELECTRIC SHAVERS

[75] Inventor: Enzo Ascoli, Lausanne, Switzerland

[73] Assignee: The Gillette Company, Boston, Mass.

[21] Appl. No.: 886,482

[22] Filed: Mar. 14, 1978

Related U.S. Application Data

[63] Continuation of Ser. No. 681,769, Apr. 29, 1976, abandoned.

[30] Foreign Application Priority Data

May 2, 1975 [GB] United Kingdom ............... 18361/75

[51] Int. Cl.² ............................................. H02K 7/14
[52] U.S. Cl. ................................... 310/50; 310/43.91;
310/254; 310/89 A; 30/43;43.91; 310/266
[58] Field of Search ...................... 310/47, 50, 80, 266,
310/43, 40, 40 MM, 254, 85 A, 89, 239;
30/43.91

[56] References Cited
U.S. PATENT DOCUMENTS

| 1,822,859 | 9/1931 | Perkins | 310/40 MM |
|---|---|---|---|
| 2,667,611 | 1/1954 | Rodzianko | 310/43 UX |
| 3,121,811 | 2/1964 | Marti et al. | 310/266 X |
| 3,234,417 | 2/1966 | Somers et al. | 310/40 MM |
| 3,283,185 | 11/1966 | Somers et al. | 310/47 |
| 3,411,206 | 11/1968 | Showers, Jr. | 30/43.91 |
| 3,924,147 | 12/1975 | Tarnow et al. | 310/239 X |
| 3,980,909 | 9/1976 | Klein | 310/50 |

FOREIGN PATENT DOCUMENTS

| 1070063 | 9/1958 | Fed. Rep. of Germany . |
| 2433770 | 1/1976 | Fed. Rep. of Germany . |
| 1116466 | 3/1960 | United Kingdom . |
| 1185912 | 3/1970 | United Kingdom . |

Primary Examiner—Donovan F. Duggan
Attorney, Agent, or Firm—Richard A. Wise; Donald E. Mahoney

[57] ABSTRACT

Electric dry shaver comprising a cutting head having at least one movable cutter, an electric motor for driving the movable cutter and electric circuit means for the motor, characterized in that the motor has a stator/rotor assembly of which at least part of the stator is integrated with a frame or housing for the shaver, and in that the frame or housing serves as a reference mounting member for the cutting head, electric motor and electric circuit means.

14 Claims, 13 Drawing Figures

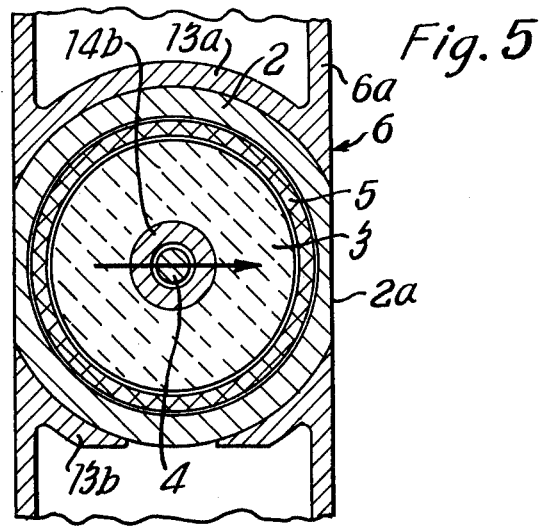
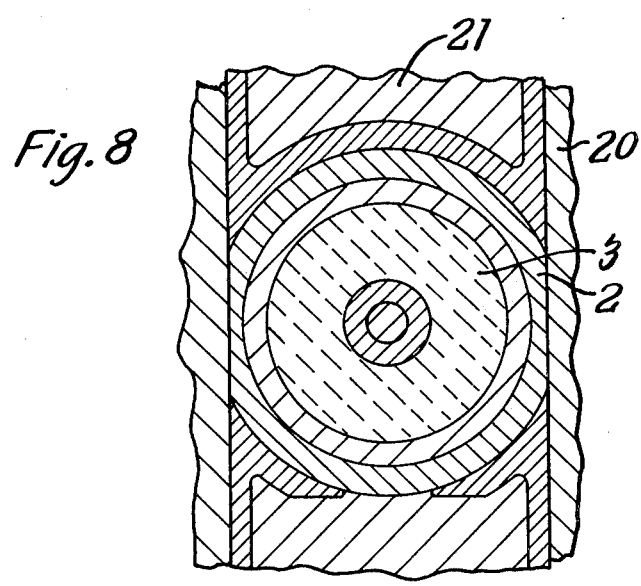

ELECTRIC SHAVERS

This is a continuation, of application Ser. No. 681,769, filed Apr. 29, 1976.

FIELD OF THE INVENTION

This invention relates to an electric shaver.

PRIOR ART

It is generally known in the field of electric motors per se, to fabricate the stationary parts of the motor as an integrated structure with the casing of the motor. For example, in German Specification No. 2433770, it is proposed to mould the motor body as an integral structure having an outer cup-shaped wall in which a magnetisable sheel is embedded and having a hollow central core upstanding within the cup from the base to support an annular permanent magnet surrounding the core, the structure also being integrated with bearings for a rotor shaft which extends through the core and supports a rotor rotating in an annular space defined between the permanent magnet and the magnetisable shell. The open-end of the moulded structure is closed by a member carrying the motor brushes internally and the motor terminals externally.

British specification No. 1116466 discloses a motor construction adapted for use in a portable appliance such as a cine-camera, wherein an attempt is made to reduce the transverse dimensions of the motor by using an outer segmented magnetisable shell as the motor casing. The shell is formed of elongated arcuate pole pieces which extend longitudinally from around a permanent magnet past and around an armature positioned in end-on arrangement to the permanent magnet and beyond the armature to surround a brush-holder and centrifugal regulator. The extensions of the pole pieces beyond the armature are used to facilitate the mounting of the brush-holder and regulator on the axis of the armature. The casing is completed by sealing strips applied along the longitudinal gaps between the adjacent edges of the elongated pole pieces.

However, this prior art is not directly of interest or value in the construction of electric shavers. It is a constant endeavour in the field of electric shavers to reduce the size and bulk of the appliance, so as to facilitate holding and manipulation thereof by the user. A major factor which limits reduction in the size of the appliance, in conventional practice, is the requirement to include a separately fabricated motor within the casing. The proposals made in the prior art may assist to a very limited extent in reducing the overall size of the motor, but it is not practicable, at least without very substantially increasing production costs and decreasing electrical efficiency of the motor, sufficiently to reduce the size of the motor materially to reduce the size and bulk of the appliance, because of the power output required to drive the cutter head under all possible conditions of use.

OBJECT OF THE INVENTION

It is an object of the present invention to provide an improved electric shaver of reduced size and bulk, without placing disadvantageous limitations on the motor construction.

It is a further object of the invention to provide an improved shaver construction which enables the various operational parts of the shaver to be readily mounted in correct predetermined positional relationship to the driving motor.

BRIEF STATEMENT OF THE INVENTION

According to the invention there is provided an electric shaver comprising a cutting head having at least one movable cutter, an electric motor for driving the movable cutter and electric circuit means for the motor, characterised in that the motor has a stator/rotor assembly of which at least part of the stator is integrated with a frame or housing for the shaver, which frame or housing serves as a reference mounting member for the cutting head, electric motor and electric circuit means.

FURTHER FEATURES OF THE INVENTION

Preferably, the width of the shaver in at least one direction does not substantially exceed the width of the motor in the said direction. In the context of this invention, this means that the overall width of the shaver does not exceed the width of the motor by more than about 10% (of the width of the motor). In comparison, in a conventional shaver, the width of the shaver is at least about 1.25 times the width of the motor. In one arrangement, the motor occupies the entire width of the shaver in the said direction. For example, the stator of the motor may be generally of cylindrical shape about an axis perpendicular to the said direction, being formed with two opposed parallel flats on its external cylindrical surface to reduce the width of the stator in the said direction.

In preferred embodiments, the stator comprises a magnetisable shell integrated with the frame or housing. Permanent magnet means may also be integrated with the frame or housing. Alternatively the permanent magnet means may be carried by the magnetisable shell.

The frame or housing is preferably integrally formed with at least one internal support for the shaft of an internal rotor of the electric motor. This internal support may also support the permanent magnet means. In addition, the electric circuit means preferably comprises a printed circuit board mounted on the frame or housing, and a brushholder for the motor brushes is preferably mounted on the printed circuit board to be positioned in accurate relationship to a collector forming part of the rotor.

The frame or housing may constitute the visible external structure of the shaver. Alternatively, the shaver may include a thin-walled external casing covering the frame or housing, the entire width of the shaver covered by said casing not substantially exceeding the width of the frame or housing.

The frame or housing may be injection moulded of plastics material. Alternatively, the frame or housing may be cast or moulded of metallic alloy. It is necessary, of course, that the stator should comprise a soft-iron shell having magnetisable properties not damaged by the temperature of moulding or casting. Where the stator also comprises a permanent magnet surrounded by a soft-iron shell, it is also necessary that the magnet should be made of magnetic material the magnetic properties of which are not damaged by the temperature of the moulding or casting.

DESCRIPTION OF DRAWINGS

Some practical embodiments of electric shaver in accordance with the invention will now be described by way of example, with reference to the accompanying drawings, in which:

FIGS. 3 to 5 show respective modifications in sectional views similar to FIG. 2;

FIGS. 7 and 8 are sectional views transverse to the plane of FIG. 6, showing alternative modifications of the moulding assembly;

DESCRIPTION OF EMBODIMENTS

Figure 1:
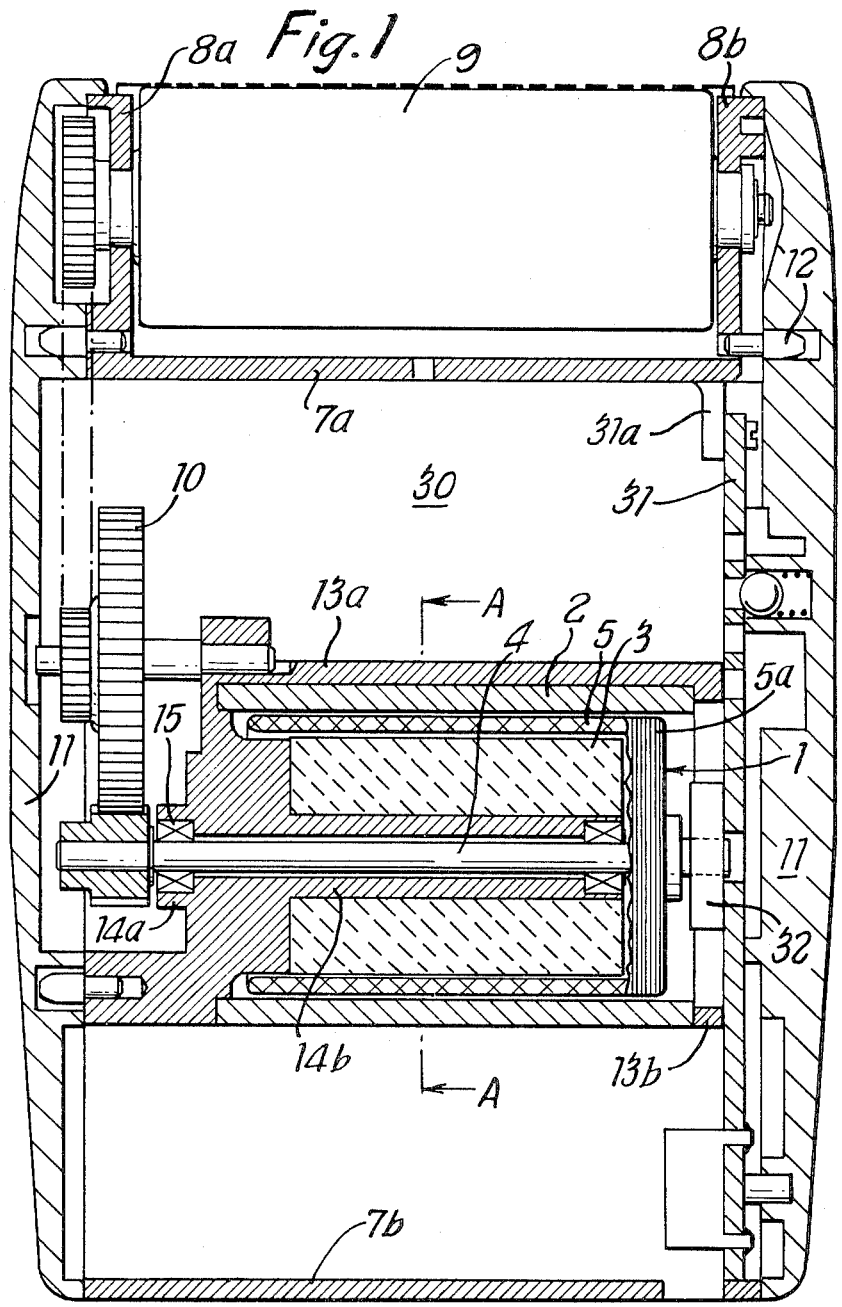
FIG. 1 is a transverse sectional view through one embodiment of electric shaver.

The shaver shown in FIG. 1 is generally of right rectangular form, with a cutter head mounted at one end of a shaver housing. The cutter head is elongated in the direction of the width of the shaver. The minimum dimension of the shaver is a depth mutually perpendicular to the longitudinal direction and the width. In accordance with this embodiment of the invention, it is the depth of the shaver which is minimized.

The shaver comprises a motor, generally designated 1, having a stator which includes an external hollow cylindrical shell 2 of magnetisable material, and an annular permanent magnet 3 surrounding the shaft 4 of the motor. An annular space is defined between the permanent magnet 3 and the external shell 2 to accommodate a cup-shaped rotor 5, which drives the motor shaft 4 at its base 5a. The axis of the motor extends across the width of the shaver transverse to the longitudinal direction thereof.

In accordance with the invention, the external magnetisable shell 2 of the motor is formed as an integral structure with the housing of the shaver. The shaver housing is generally designated 6. The sectional webs 7a, 7b of the housing shown in FIG. 1, which extend across the depth of the shaver, are integrally formed with the side walls 6a (see FIG. 2) of the housing, which extend parallel to the plane of the drawing above and below said plane.

The housing includes parts 8a, 8b associated with the mounting of the cutter head, which has a movable cutter 9. However, the movable cutter 9 and also the transmissive drive 10 therefore from the motor are only illustrated diagrammatically in FIG. 1, because the particular construction of cutter head and drive employed form no part of the present invention. One possible construction has an arcuately oscillating cutter for cooperation with a cylindrical foil, the transmissive drive including means for converting the rotary output of the motor shaft 4 into an arcuately oscillating cutter motion.

In the embodiment illustrated, the end walls in the direction of the depth of the shaver are formed by separately moulded elements 11 fitting detachably to the housing 6, as by means indicated at 12. Removal of these end walls 11 provides access to the interior of the housing, for example to replace batteries which are accommodated in the spaces 30 or for making repairs, for example to a printed circuit board 31 which bears electric circuitry associated with the electric motor and its batteries. The printed circuit board 31 is also mounted on the housing 6, as indicated at 31a, and carries a brush-holder 32 carrying brushes cooperating with a collector (not shown) carried by the motor shaft 4.

As can be seen from FIG. 1 of the drawings, the housing also includes internal parts 13a, 13b which are integrated with the external shell 2 of the stator, and parts 14a, 14b which are not only integrated with the permanent magnet 3 but also integrated with bearings 15 for the motor shaft 4.

Figure 2:
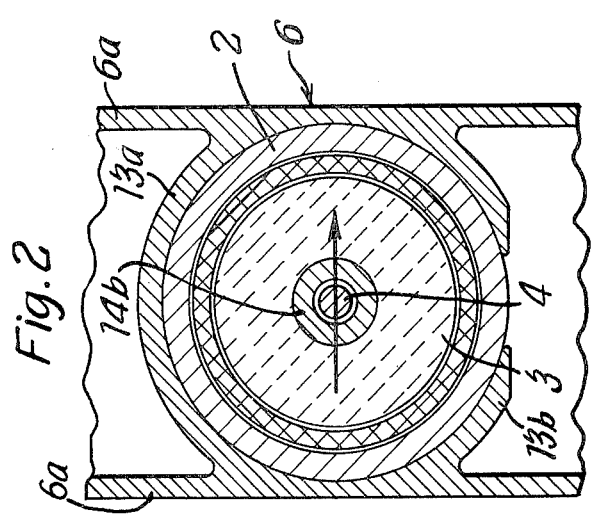
FIG. 2 is a section on the line A-A of FIG. 1.

With the arrangement described above, it is possible to minimize the depth of the housing, and thus the shaver as a whole, as more clearly appears from the sectional view of FIG. 2. In the embodiment of FIGS. 1 and 2, the external stator shell 2 occupies substantially the whole depth of the shaver, but a thin thickness of the housing 6 is present on both sides of the stator.

Figure 3:
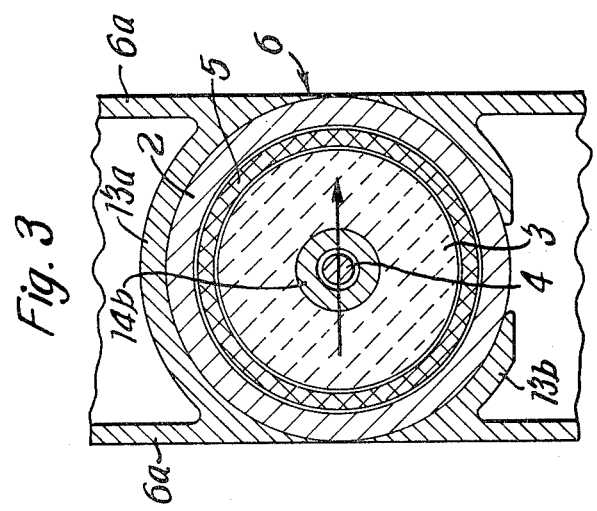
Figure 4:
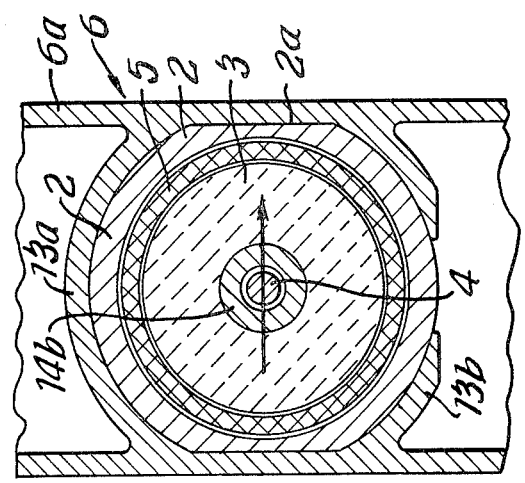

In the modification of FIG. 3, the cylindrical external stator shell 2 occupies the whole depth of the housing. In the modification of FIG. 4, the cylindrical stator shell is formed with two external flats 2a and a thin thickness of housing is present outside these external flats.

The modification of FIG. 5 provides the maximum minimization of shaver depth. In this modification the external stator shell 2 is formed with opposed flats 2a, and the dimension of the stator between these external flats corresponds to the depth of the housing 6.

In FIGS. 2 to 5, the large arrow indicates the direction of magnetization of the magnet 3.

In the construction described above, the integration of the housing 6 with the stator of the motor ensures that the magnetisable shell 2 and permanent magnet 3 are located in accurate coaxial arrangement, and the motor shaft 4 carrying the rotor 5 is also located in strict coaxial relationship with the stator due to the integration of the housing 6 with the shaft bearings 15. Furthermore, the integrated housing/motor structure serves, not only as a reference member for mounting of the parts of the motor, but also as a reference member for mounting of the other parts of the shaver, particularly the cutter head and the printed circuit board 31. These other parts of the shaver are thereby readily located in a required accurate positional relationship to the motor. In the case of the cutter head, this assists the achievement of a reliable, silent transmission from the motor to the cutter head which involves minimum power consumption. In addition, the cutter head may include both a short hair cutter and a long hair trimmer, and the accurate relative positioning of said cutter and trimmer is important to enable a simple coupling to be provided between them. In the case of the printed circuit board 31 which carries the brush-holder 32, the mounting of the circuit board in a predetermined position on the housing/motor structure ensures that the brush-holder will be located in strict coaxial relationship with the collector carried by the motor shaft.

Figure 6:
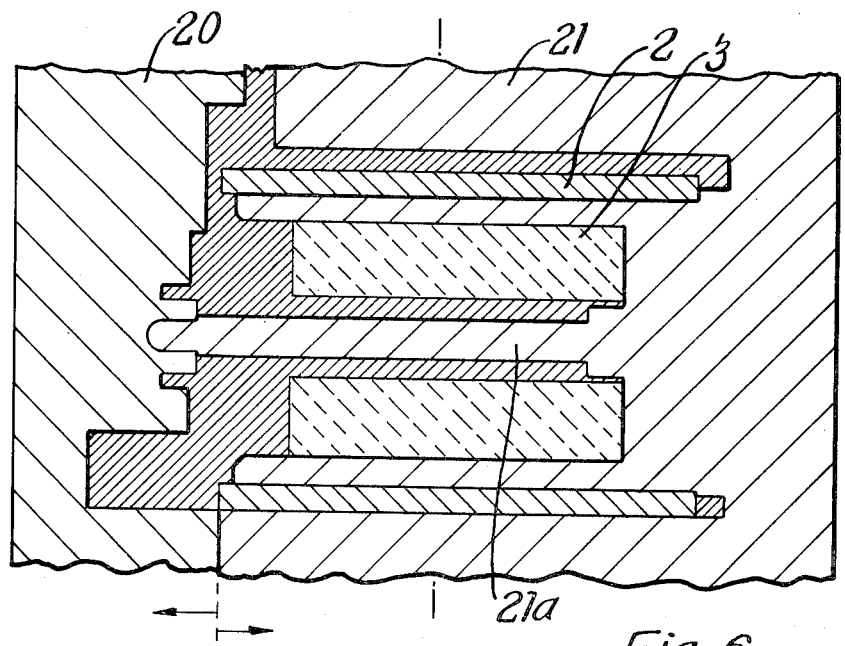
FIG. 6 shows in section one possible moulding assembly for use in manufacture of the shaver of FIGS. 1 and 2.
Figure 7:
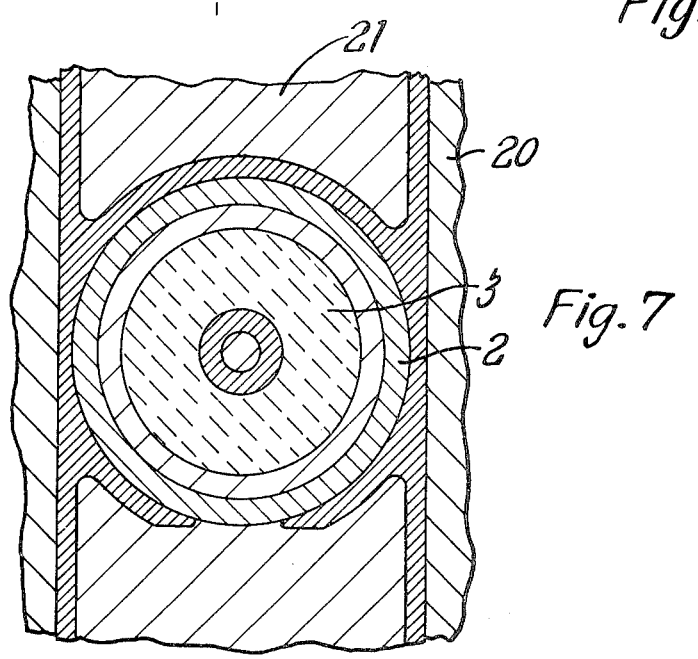

FIGS. 6 and 7 illustrate a possible moulding system for forming the integral housing and stator structure previously described with reference to FIGS. 1 and 2. In FIG. 6, a moulding assembly is proposed comprising an external mould 20 and an internal mould 21. It is to be noted that the core 21a of the internal mould may be very slightly tapered to facilitate separation of the internal and external moulds. This separation takes place in a direction of the arrows indicated in FIG. 6.

FIG. 8 indicates diagrammatically, in transverse sectional view, the cross-section of the internal and external moulds appropriate to form the modification of FIG. 5 referred to above.

Figure 9:
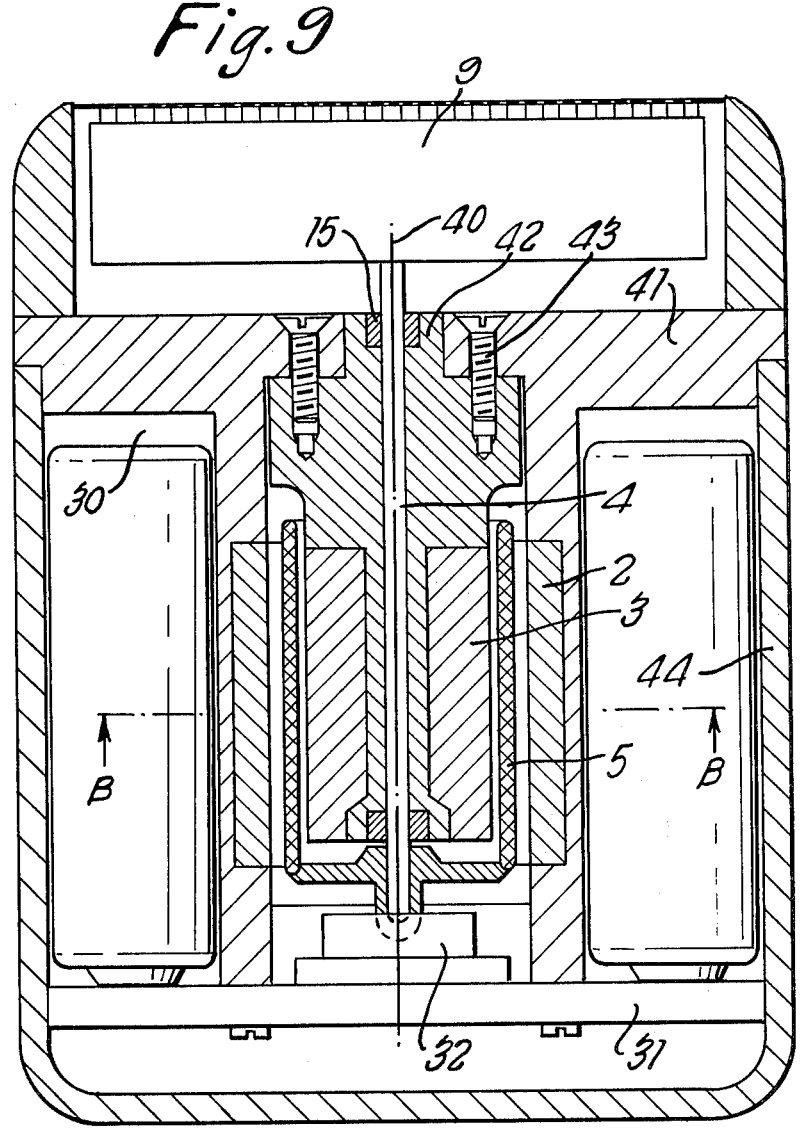
FIG. 9 is a transverse sectional view through an alternative embodiment of electric shaver.
Figure 10:
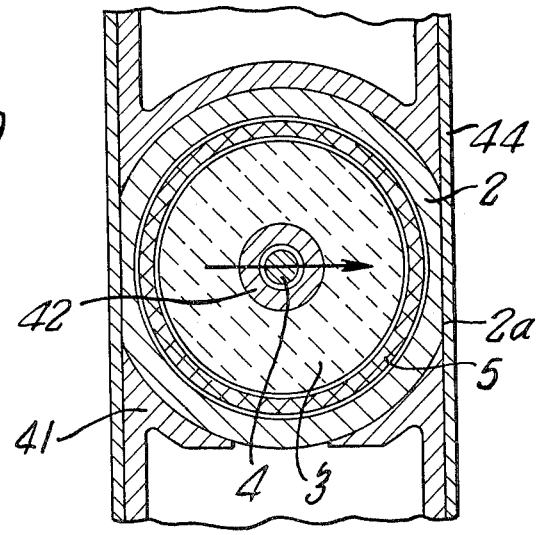
FIG. 10 is a section on the line B-B of FIG. 9.

In the construction previously described, the integrated housing/motor structure constitutes the externally visible structure or casing of the shaver. FIGS. 9 and 10 illustrate an alternative embodiment in which at least a part of the stator of the motor is integrated with a frame which serves as a reference member for the mounting of the other part of the shaver.

In FIGS. 9 and 10, the same reference numerals as those of FIGS. 1 and 5 are used to identify parts not specifically referred to. The construction mainly differs from that shown in FIG. 1 in that the axis 40 of the motor lies transverse the longitudinal direction of the cutter head, which has a cutter 9 mounted, for example, for linear reciprocation along its longitudinal axis.

The magnetisable shell 2 of the stator is integrated with a shaver frame 41 analogous to the housing 6 of the FIG. 1 embodiment. The frame 41 acts as a reference member for the mounting of an interior support 42, the mounting screws being shown at 43, which internal support is itself integrated with the permanent magnet 3 and the bearings 15 of the motor shaft 4 carrying a bell or cup-shaped rotor 5. In addition, the cutter head is mounted on the frame 41, as well as the printed circuit board 31, which again carries a brush-holder 32 for brushes which cooperate with a collector or commutator carried by the motor shaft 4.

In the embodiment of FIGS. 9 and 10, the shaver is completed by a thin-walled external sleeve or casing 44, which is slidably received over the frame 41 and the shaver parts carried thereby. As can be seen from FIG. 10, the provision of the external casing 44 does not substantially increase the thickness of the shaver. The thickness of the shaver remains less than 10% more than the thickness of the motor, as compared with a figure of about 25% in the case of a conventional shaver construction wherein a separately fabricated motor is mounted on a preformed frame or housing.

Figure 11:
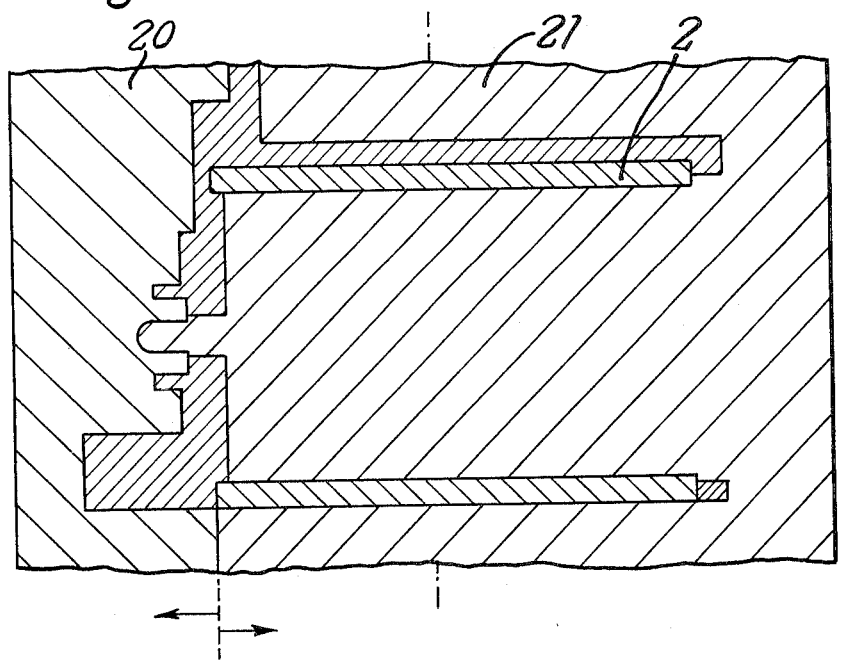
FIG. 11 shows in section a moulding assembly for use in manufacture of the shaver of FIGS. 9 and 10.

A moulding assembly for use in producing the shaver construction of FIGS. 9 and 10 is diagrammatically illustrated in FIG. 11, the reference numerals corresponding to those employed in FIG. 6.

Figure 12:
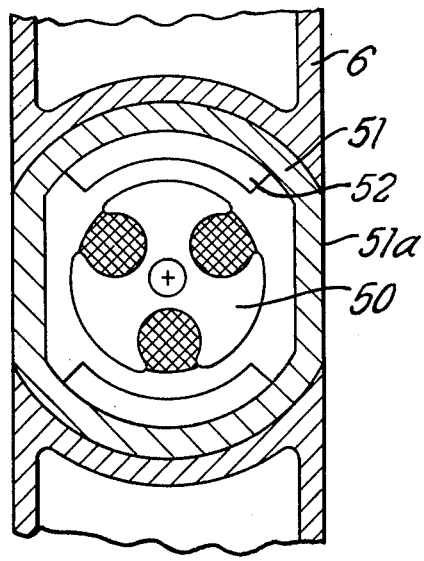
FIGS. 12 and 13 respectively show further modifications of shaver construction, in sectional views similar to FIGS. 2 and 10.
Figure 13:
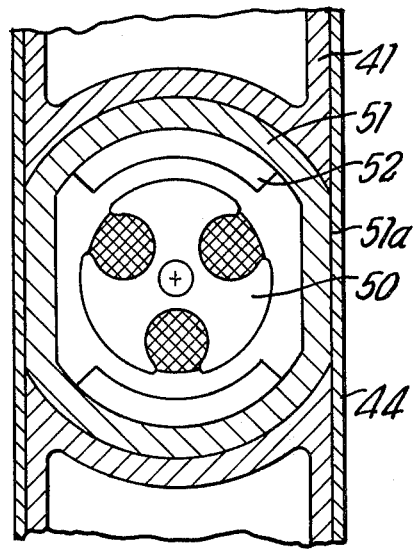

Two further modifications of shaver construction are illustrated in FIGS. 12 and 13. In each of these modifications the motor of FIGS. 1 and 9 is replaced by a conventional "slotted iron" motor 50, rotating within a stator consisting of a magnetisable shell 51 having segmented permanent magnets 52 secured, as by glueing, to the interior surface of said shell.

In FIG. 12, the magnetisable shell 51 having opposed flats 51a is integrated with a housing 6 which comprises the visible external structure of the shaver and serves as a reference member for the mounting of the other parts of the shaver, in the manner previously described.

In FIG. 13, the magnetisable shell 51 having opposed flats 51a is integrated with a frame 41 on which are mounted the other operative parts of the shaver, but the external appearance of the shaver is determined by a thin-walled casing 44 slidably received over the frame 41.

It will be appreciated that various further modifications are possible within the scope of the invention as defined in the appended claims. In particular the invention may also be employed primarily to minimize the dimensions of the shaver in the longitudinal direction and in the direction of the width, instead of or additionally to minimizing the depth of the shaver.

I claim:

1. In an electric shaver comprising a housing, a cutting head, electric motor having a stator including a hollow cylinder of magnetizable material and a rotor mounted for rotation within the stator cylinder, and electric circuit means for supplying energizing current to the motor, the improvement comprising:

the stator having two flat parallel opposed faces and the housing being moulded in situ around the hollow stator cylinder with an external surface of the housing formed flush with the flat faces of the stator so as to be contiguous with the stator from end to end to secure and locate the stator cylinder in position and to serve as a reference member for mounting of the cutting head, electric motor and electric circuit means.

2. Shaver according to claim 1, wherein the width of the shaver in at least one direction does not exceed the width of the motor in the said direction by more than 10 percent of said width of the motor.

3. Shaver according to claim 2, wherein the motor occupies the entire width of the shaver in the said direction.

4. Shaver according to claim 1, wherein the stator has permanent magnet means integrated with the housing, said permanent magnet means being positioned within the magnetisable shell to define an annular space accommodating a bell-shaped rotor.

5. Shaver according to claim 1, wherein the housing carries at least one bearing for the shaft of the rotor of the electric motor.

6. Shaver according to claim 5, wherein the electric circuit means comprises a printed circuit board mounted on the housing, and a brush-holder for the motor brushes is mounted on the printed circuit board to be positioned in accurate relationship to a collector forming part of the rotor.

7. Shaver according to claim 1, further including, a thin-walled external casing being provided to cover the housing, the entire width of the shaver covered by said casing not substantially exceeding the width of the housing.

8. In an electric dry shaver a housing, a cutting head, electric motor having a stator including a hollow cylinder of magnetizable material and a rotor mounted for rotation within the stator cylinder, and electric means for supplying energizing current to the motor including a motor brush set cooperating with a collector forming part of the rotor, the improvement comprising:

the stator having two flat parallel opposed faces and the housing being moulded in situ around the hollow stator cylinder with an external surface of the housing formed flush with the flat faces of the stator so as to be contiguous with the stator from end to end to secure and locate the stator cylinder in position and to serve as a reference member for mounting of the rotor, the cutter head and the electric circuit means including the motor brush set in an accurate positioned relationship with one another and with the stator.

9. Shaver according to claim 8, wherein the width of the shaver in at least one direction does not exceed the width of the motor in the said direction by more than 10 percent of said width of the motor.

10. Shaver according to claim 9, including a thin-walled external casing covering the said shaver body.

11. Shaver according to claim 8, wherein the said housing comprises the visible external structure of the shaver.

12. Shaver according to claim 8, wherein the stator has permanent magnet means integrated with the housing, said permanent magnet means being positioned within the magnetisable shell to define an annular space accommodating a bell-shaped rotor.

13. Shaver according to claim 8, wherein the stator has segmental permanent magnets fixedly mounted on the interior surface of the magnetisable shell, said stator surrounding a cylindrical internal rotor.

14. Shaver according to claim 8, wherein the magnetisable shell occupies the entire width of the said housing at least in one transverse dimension of the shaver.

* * * * *